(12) United States Patent
LeBlanc

(10) Patent No.: US 11,642,924 B2
(45) Date of Patent: May 9, 2023

(54) HITCH

(71) Applicant: Kevin LeBlanc, Belle Rose, LA (US)

(72) Inventor: Kevin LeBlanc, Belle Rose, LA (US)

( * ) Notice: Subject to any disclaimer, the term of this patent is extended or adjusted under 35 U.S.C. 154(b) by 237 days.

(21) Appl. No.: 17/180,404

(22) Filed: Feb. 19, 2021

(65) Prior Publication Data

US 2022/0266641 A1   Aug. 25, 2022
US 2022/0266641 A1   Aug. 25, 2022

(51) Int. Cl.
*B60D 1/06* (2006.01)
*B60D 1/155* (2006.01)
*B60D 1/46* (2006.01)

(52) U.S. Cl.
CPC .............. *B60D 1/065* (2013.01); *B60D 1/155* (2013.01); *B60D 1/46* (2013.01)

(58) Field of Classification Search
CPC .................................... B60D 1/46; B60D 1/52
See application file for complete search history.

(56) References Cited

U.S. PATENT DOCUMENTS

| | | | |
|---|---|---|---|
| D376,780 S | 12/1996 | McCoy | |
| 6,457,733 B1 * | 10/2002 | Hansen | B60D 1/52 280/496 |
| 6,824,156 B2 * | 11/2004 | Smith | B60D 1/52 280/490.1 |
| 7,222,873 B2 * | 5/2007 | Rodgers | B60D 1/52 280/495 |
| 7,451,996 B2 * | 11/2008 | Miles | B60D 1/52 280/495 |
| 7,559,570 B2 * | 7/2009 | Cearns | B60D 1/46 280/495 |
| D795,756 S | 8/2017 | McCuskey | |
| 10,040,326 B1 * | 8/2018 | O'Connell | B60D 1/52 |
| 10,065,466 B2 * | 9/2018 | Lisby | B60D 1/488 |
| D847,697 S * | 5/2019 | McCuskey | D12/162 |
| 10,759,325 B1 * | 9/2020 | Polny | B60P 3/125 |
| 2004/0173654 A1 * | 9/2004 | McAlister | B60D 1/52 280/495 |
| 2005/0275194 A1 * | 12/2005 | Wegener | B60D 1/56 280/500 |
| 2012/0119467 A1 * | 5/2012 | Svihla | B60D 1/46 280/477 |
| 2022/0396109 A1 * | 12/2022 | Shaffer | B60D 1/06 |

* cited by examiner

*Primary Examiner* — Kevin Hurley
(74) *Attorney, Agent, or Firm* — Edel Patents LLC; John B. Edel

(57) ABSTRACT

Hitches are disclosed relating to towing that include a sleeve, a receiver stem, a post and a coupler. The post may slide within the channel allowing the hitch to be adjustable. The coupler may be a socket configured to receive a ball. The post and the coupler may be in alignment. The described hitches may be useful for the towing of vehicles having a receiver tube.

17 Claims, 1 Drawing Sheet

HITCH

Hitches described herein may be used in towing. Certain hitches disclosed herein may be used in the towing of rear-wheel-drive vehicles and more particularly certain hitches described herein may further be useful in connecting the receiver tube of a vehicle to a wheel lift of a tow truck.

DETAILED DESCRIPTION

Example 1

Figure 1:
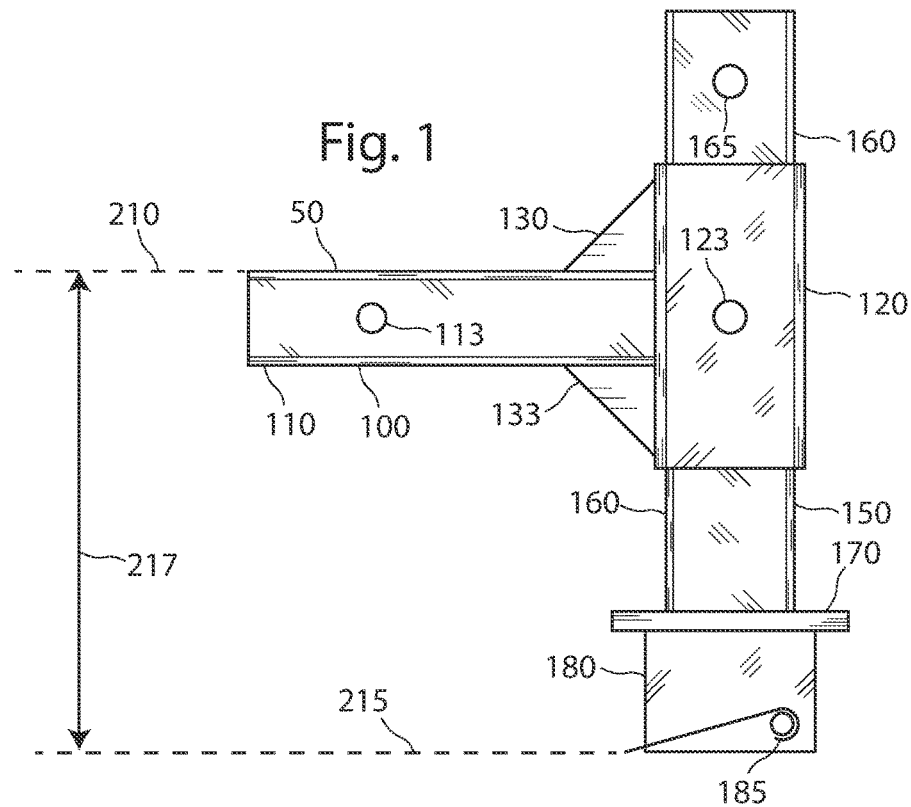
FIG. 1 shows a side view of the hitch.

As depicted in the figures Hitch 50 may comprise a T-member 100 and Coupling member 150. T-member 100 may include Receiver stein 110, Receiver stein hitch pin hole 113, Sleeve 120, Sleeve hitch pin hole 123, Top gusset 130, and Bottom gusset 133. Coupling member 150 may include Post 160, Post first hitch pin hole 165, Post hitch pin 167, Platform 170, Coupler 180, and Ball pin 185. The distance between the Receiver stein top height 210 and the Coupler bottom height 215 may be characterized as the Hitch drop 217.

Hitch 50 may be used in the towing of a variety of vehicles. Among those vehicles, rear wheel drive trucks may be a common example. The towing may be done supported on Ball 267 of Tow Truck 250. T-member 100 may be configured as depicted in FIG. 1 with Sleeve 120 extending both above and below Receiver stein 110. In alternate embodiments, Sleeve 120 and Receiver stein 110 may take other forms including an L shape. T-member 100 may be configured to withstand considerable torque, straight-line forces, twisting forces, and other forces that may be produced during the towing process. Receiver stein hitch pin hole 113 may be configured to align with Receiver hitch pin hole 235 of Receiver tube 233 securing Hitch 50 to a vehicle, such as a truck, in a manner similar to the conventional attachment of a trailer ball. Post 160 may be configured to slide within Sleeve 120 such that Post 160 may be locked in place within Sleeve 120 by way of Post hitch pin 167. Sleeve hitch pin hole 123 is the hole in Sleeve 120 through which Post hitch pin 167 locks Post 160 in place relative to Sleeve 120. Sleeve hitch pin hole 123 would be present on both sides of Sleeve 120. Top gusset 130 and Bottom gusset 133 are optionally present to further structurally reinforce the connection between Receiver stein 110 and Sleeve 120. Coupling member 150 may include Post 160 welded to Coupler 180. Coupler 180 may for example include Platform 170. Post first hitch pin hole 165 may serve as the uppermost of a series of holes configured to place Coupler 180 at various heights relative to Receiver stein 110. In certain embodiments, the range of possible positions for Coupler 180 would all be below Sleeve 120. In certain embodiments, the range of possible positions for Coupler 180 would all be below Receiver stein 110. Ball pin 185 may be used to secure Ball 267 within Coupler 180 during towing.

In one example, Receiver stein 110 may be constructed from 8 inches of 2 inch by 2 inch solid carbon steel bar stock with Receiver stein hitch pin hole 113 being a $21/32$ inch diameter hole which may be drilled 2.5 inches from one end and 1 inch from the edge. Receiver stein hitch pin hole 113 may be used to attach the stein to Receiver tube 233 using a $5/8$ inch pin and clip. Sleeve 120 may be constructed from a $5 3/4$ inch long piece of 3 inch by 3 inch by $1/4$ inch carbon steel box tubing. Sleeve 120 may be machined from the inside using a milling machine to remove the weld seam that is created when box tubing is manufactured. Sleeve hitch pin hole 123 may be $21/32$ inches diameter and may be drilled at $1 1/2$ inches from the edge and $2 7/8$ inches from the end. Sleeve hitch pin hole 123 receives a $5/8$ inch pin and clip for connection to Post 160. Sleeve 120 and Receiver stein 110 may be tig welded together with Receiver stein 110 placed against the center of Sleeve 120 and Receiver stein hitch pin hole 113 and Sleeve hitch pin hole 123 aligned in parallel to one another. Top gusset 130 and Bottom gusset 133 may each be triangular in shape and measuring 2.8 inches by 2 inches by 2 inches by $1/4$ inch thick and may be welded into the corners where the Receiver stein 110 joins Sleeve 120. Top gusset 130 and Bottom gusset 133 may be center aligned. Coupling member 150 may be constructed using a gooseneck coupler head as Coupler 180. That gooseneck coupler head may be a solid cast piece of steel having a $2 5/16$ inch socket that accepts a $2 5/16$ inch ball. The casting may also have a $1/2$ inch diameter hole at the lower portion of the socket which accepts a $1/2$ inch locking pin and clip to secure the hitch to the ball. The top of the head assembly may have a 5 inch diameter flat plate—namely Platform 170—to which Post 160 may be tig welded to the center. Post 160 may be a piece of $2 1/2$ inch by $2 1/2$ inch by $1/4$ inch carbon steel box tubing 12" in length. Post 160 may be drilled with four height adjustment holes of $21/32$" in diameter. These holes may be $1 1/4$ inches from the edge. The first hole may be located at $3 3/4$ inches from the bottom of Post 160 with the next three holes $2 1/4$" apart, center to center. The total height adjustment may be $6 3/4$ inches.

Example 2

A variety of vehicles may be towed using Hitch 50 by utilizing Receiver tube 233 of Vehicle receiving a tow 230. The Vehicle receiving a tow 230 may have a Receiver tube 233, Receiver hitch pin hole 235, and Receiver hitch pin 237. Tow Truck 250 may have a Wheel lift 260, a Wheel lift cross bar 265, and a Ball 267.

Figure 2:
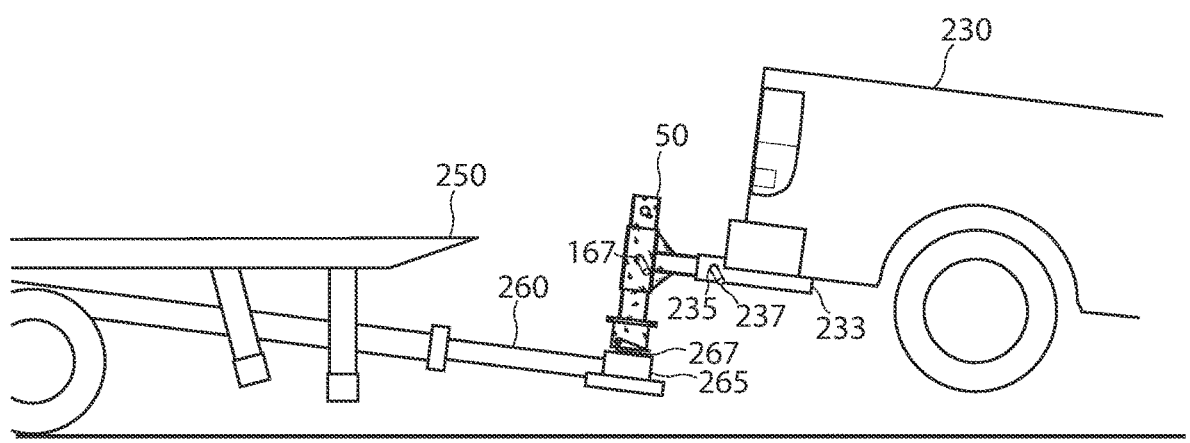
FIG. 2 shows a vehicle in tow using the hitch.

Hitch 50 may be utilized to tow by the following method. First, Hitch 50 may be attached to Vehicle receiving a tow 230 by inserting Receiver stein 110 into Receiver tube 233 of Vehicle receiving a tow 230. Receiver hitch pin 237 may be inserted through Receiver hitch pin hole 235 locking Receiver tube 233 in place relative to Hitch 50. Coupling member 150 may then be positioned such that Post 160 is within Sleeve 120 and such that Coupler bottom height 215 is far enough off the ground that Wheel lift 260 and Ball 267 may be positioned below Coupler 180. Wheel lift 260, sometimes referred to as a stinger bar, may then be lifted such that Ball 267 enters Coupler 180. In certain examples the lifting may be by hydraulic lifting. Coupler 180 may then be locked onto the ball. The locking of Coupler 180 onto Ball 267 may be done by inserting Ball pin 185. Note that in FIG. 2 only the base of Ball 267 is shown. After Hitch 50 is properly secured to both Vehicle receiving a tow 230 and Tow Truck 250, Wheel lift 260 may be lifted to an appropriate height for towing, any other necessary pre-towing adjustments and safety checks may be implemented, and Tow Truck 250 may tow Vehicle receiving a tow 230. During the tow the rear of Vehicle receiving a tow 230 would be held aloft by Receiver stein 110. The towing may be conducted with the tires of Vehicle receiving a tow 230 nearest Receiver tube 233 being off the ground during the tow.

Receiver stein top height 210 and Coupler bottom height 215 are separated by distance referred to herein as hitch drop. In FIG. 1, hitch drop is shown as Hitch drop 217. The minimum hitch drop is the smallest hitch drop at which the hitch can be secured for towing. The minimum hitch drop may, for example, be 8.0 inches with certain examples falling between 2.0 and 12.0 inches and a significant number of those examples falling between 5.0 and 10.0 inches. The maximum hitch drop is the greatest hitch drop at which the hitch can be secured for towing. The maximum hitch drop may, for example, be 14.8 inches with certain examples falling between 9.0 and 24.0 inches and a significant number of those examples falling between 11.9 and 19.4 inches. The hitch drop range is the distance separating the maximum hitch drop from the minimum hitch drop. The hitch drop range may, for example, be 6.8 inches with certain examples falling between 3.5 and 12.0 inches and a significant number of those examples falling between 5.1 and 9.4 inches. Hitch drop 217 may be large enough that Coupler 180 is within 6 inches of the ground prior to Vehicle receiving a tow 230 being lifted. In certain examples after Hitch 50 is installed on Vehicle receiving a tow 230, Hitch drop 217 may be greater than the distance between Coupler 180 and the ground.

Hitches described herein may, for example, comprise a sleeve; a receiver stein connected to the sleeve at an orientation within 25° of perpendicular to the sleeve; a channel within the sleeve; a post configured to slide within the channel; and a coupler attached to the post; such that the coupler comprises a socket configured to receive a ball; the receiver stein may be configured to lock in place within the channel at a first position relative to the sleeve; a central axis of the sleeve may run through the post and through the coupler; and the coupler and the receiver stein may be the only principal connectors present on the hitch. In a related example, the receiver stein may be configured to lock in place within the channel at a second position relative to the sleeve. In a related example, the coupler may comprise a locking mechanism to secure the ball within. In a related example, the sleeve and the post may be configured to allow for a hitch drop of at least 8 inches. In a related example, the hitch may be capable of stably holding the rear of a first vehicle aloft fully supported by the ball. In a related example, the receiver stein may be configured to lock in place within a receiver tube with a hitch pin. In a related example, the post may be configured to lock in place within the sleeve with a hitch pin. Methods of towing described herein may, for example, comprise securing a receiver stein of a hitch within a towing receiver tube of a first vehicle; securing a ball of a second vehicle within a coupler of the hitch; providing sufficient force at the ball to raise both the hitch and an end of the first vehicle; and towing the first vehicle with the second vehicle. A related method may comprise a sleeve, a channel within the sleeve, and a post configured to slide within the channel; such that the receiver stein is connected to the sleeve at an orientation within 25° of perpendicular to the sleeve; such that the coupler is attached to the post; the coupler comprises a socket configured to receive the ball; the receiver stein is configured to lock in place within the channel at a first position relative to the sleeve; a central axis of the sleeve runs through the post and through the coupler; and the coupler and the receiver stein are the only principal connectors present on the hitch. In a related method, the receiver stein may be configured to lock in place within the channel at a second position relative to the sleeve. In a related method, the coupler comprises a locking mechanism to secure the ball within. In a related method, the sleeve and the post may be configured to allow for a hitch drop of at least 8 inches. In a related method, the hitch may be capable of stably holding the rear of the first vehicle aloft fully supported by the ball. In a related method, the receiver stein may be configured to lock in place within a receiver tube with a hitch pin. In a related method, the post may be configured to lock in place within the sleeve with a hitch pin.

The orientation of components such as the sleeve, post, receiver stein and other similar components is determined by the axis of greatest symmetry. For example, when objects are constructed of tubing or pipe the orientation of the central axis of the tubing or pipe would be regarded as the orientation of the pipe.

As that phrase is used herein "principal connectors" describes the following four types of towing connectors: ball(s), coupler(s), receiver stem(s), and receiver tube(s). In certain embodiments, the hitch described herein may have exactly two principal connectors.

The above-described embodiments have a number of independently useful individual features that have particular utility when used in combination with one another including combinations of features from embodiments described separately. There are, of course, other alternate embodiments which are obvious from the foregoing descriptions, which are intended to be included within the scope of the present application.

I claim:

1. A hitch comprising:
   a. a sleeve;
   b. a receiver stein connected to the sleeve at an orientation within 25° of perpendicular to the sleeve;
   c. a channel within the sleeve;
   d. a post configured to slide within the channel; and
   e. a coupler attached to the post;
   f. wherein the coupler comprises a socket configured to receive a ball;
   g. wherein the post is configured to lock in place within the channel at a first position relative to the sleeve;
   h. wherein a central axis of the sleeve runs through the post and through the coupler; and
   i. wherein the coupler and the receiver stein are the only principal connectors present on the hitch.

2. The hitch of claim 1 wherein the post is configured to lock in place within the channel at a second position relative to the sleeve.

3. The hitch of claim 1 wherein the coupler comprises a locking mechanism to secure the ball within.

4. The hitch of claim 1 wherein the sleeve and the post are configured to allow for a hitch drop of at least 8 inches.

5. The hitch of claim 1 wherein the hitch is capable of stably holding the rear of a first vehicle aloft fully supported by the ball.

6. The hitch of claim 1 wherein the receiver stein is configured to lock in place within a receiver tube with a hitch pin.

7. The hitch of claim 1 wherein the post is configured to lock in place within the sleeve with a hitch pin.

8. The hitch of claim 1 wherein the post is configured to lock in place within the channel at a second position relative to the sleeve and wherein the coupler comprises a locking mechanism to secure the ball within.

9. The hitch of claim 1 wherein the sleeve and the post are configured to allow for a hitch drop of at least 8 inches and wherein the hitch is capable of stably holding the rear of a first vehicle aloft fully supported by the ball.

10. The hitch of claim 1 wherein the receiver stein is configured to lock in place within a receiver tube with a hitch pin and wherein the post is configured to lock in place within the sleeve with a hitch pin.

11. The hitch of claim 1 wherein the coupler comprises a locking mechanism to secure the ball within and wherein the sleeve and the post are configured to allow for a hitch drop of at least 8 inches.

12. The hitch of claim 1 wherein the coupler comprises a locking mechanism to secure the ball within and wherein the hitch is capable of stably holding the rear of a first vehicle aloft fully supported by the ball.

13. The hitch of claim 1 wherein the coupler comprises a locking mechanism to secure the ball within and wherein the post is configured to lock in place within the sleeve with a hitch pin.

14. The hitch of claim 1 wherein the post is configured to lock in place within the channel at a second position relative to the sleeve, wherein the coupler comprises a locking mechanism to secure the ball within, and wherein the sleeve and the post are configured to allow for a hitch drop of at least 8 inches.

15. The hitch of claim 1 wherein the hitch is capable of stably holding the rear of a first vehicle aloft fully supported by the ball, wherein the receiver stein is configured to lock in place within a receiver tube with a hitch pin, and wherein the post is configured to lock in place within the sleeve with a hitch pin.

16. The hitch of claim 1 wherein the coupler comprises a locking mechanism to secure the ball within, wherein the sleeve and the post are configured to allow for a hitch drop of at least 8 inches, and wherein the hitch is capable of stably holding the rear of a first vehicle aloft fully supported by the ball.

17. The hitch of claim 1 wherein the sleeve and the post are configured to allow for a hitch drop of at least 8 inches, wherein the hitch is capable of stably holding the rear of a first vehicle aloft fully supported by the ball, and wherein the post is configured to lock in place within the sleeve with a hitch pin.

* * * * *

UNITED STATES PATENT AND TRADEMARK OFFICE
CERTIFICATE OF CORRECTION

| | |
|---|---|
| PATENT NO. | : 11,642,924 B2 |
| APPLICATION NO. | : 17/180404 |
| DATED | : May 9, 2023 |
| INVENTOR(S) | : Kevin LeBlanc |

It is certified that error appears in the above-identified patent and that said Letters Patent is hereby corrected as shown below:

In the Specification

All 32 instances of "stein," in which the first instance is at Column 1, Line 20, and the 32nd instance is at Column 4, Line 13, should be replaced with "stem".

In the Claims

The two instances of "stein" in Claim 1 (Column 4, Lines 34 and 45), and each instance of "stein" in Claims 6 (Column 4, Line 57), 10 (Column 5, Line 3), and 15 (Column 6, Line 6), should be replaced with "stem".

Signed and Sealed this
Twenty-fourth Day of October, 2023

Katherine Kelly Vidal
*Director of the United States Patent and Trademark Office*